(12) United States Patent
Wu et al.

(10) Patent No.: US 9,505,058 B2
(45) Date of Patent: Nov. 29, 2016

(54) STABILIZED METALLIC NANOPARTICLES FOR 3D PRINTING

(71) Applicant: XEROX CORPORATION, Norwalk, CT (US)

(72) Inventors: Yiliang Wu, Oakville (CA); Marko Saban, Toronto (CA)

(73) Assignee: XEROX CORPORATION, Norwalk, CT (US)

(*) Notice: Subject to any disclaimer, the term of this patent is extended or adjusted under 35 U.S.C. 154(b) by 270 days.

(21) Appl. No.: 14/279,508

(22) Filed: May 16, 2014

(65) Prior Publication Data

US 2015/0328835 A1  Nov. 19, 2015

(51) Int. Cl.

| | | |
|---|---|---|
| *B22F 1/02* | (2006.01) | |
| *B22F 1/00* | (2006.01) | |
| *B29C 67/00* | (2006.01) | |
| *B22F 3/105* | (2006.01) | |
| *B33Y 10/00* | (2015.01) | |
| *B33Y 70/00* | (2015.01) | |
| *B29K 103/06* | (2006.01) | |

(52) U.S. Cl.
CPC ............ *B22F 1/0018* (2013.01); *B22F 1/0059* (2013.01); *B22F 3/1055* (2013.01); *B29C 67/0074* (2013.01); *B29K 2103/06* (2013.01); *B33Y 10/00* (2014.12); *B33Y 70/00* (2014.12); *Y02P 10/295* (2015.11)

(58) Field of Classification Search
CPC ..................................................... B22F 1/0018
See application file for complete search history.

(56) References Cited

U.S. PATENT DOCUMENTS

| | | | |
|---|---|---|---|
| 7,270,694 B2* | 9/2007 | Li ........................ | B22F 1/0018 75/351 |
| 2011/0135808 A1* | 6/2011 | Liu ................................ | 427/58 |
| 2013/0105980 A1* | 5/2013 | Yasuda ................. | H05K 1/097 257/772 |
| 2013/0309679 A1* | 11/2013 | Ismagilov .......... | C12N 15/1003 435/6.12 |
| 2013/0344232 A1* | 12/2013 | Chopra ................. | H01G 13/00 427/79 |

* cited by examiner

*Primary Examiner* — George Wyszomierski
*Assistant Examiner* — Ngoclan T Mai
(74) *Attorney, Agent, or Firm* — MH2 Technology Law Group LLP

(57) ABSTRACT

A material for use in a 3D printer. The material may include a plurality of metallic particles and a stabilizing material. The metallic particles may have an average cross-sectional length that is less than or equal to about 100 nm. The stabilizing material may include an organoamine, carboxylic acid, thiol and derivatives thereof, xanthic acid, polyethylene glycols, polyvinylpyridine, polyninylpyrolidone, or a combination thereof.

20 Claims, 1 Drawing Sheet

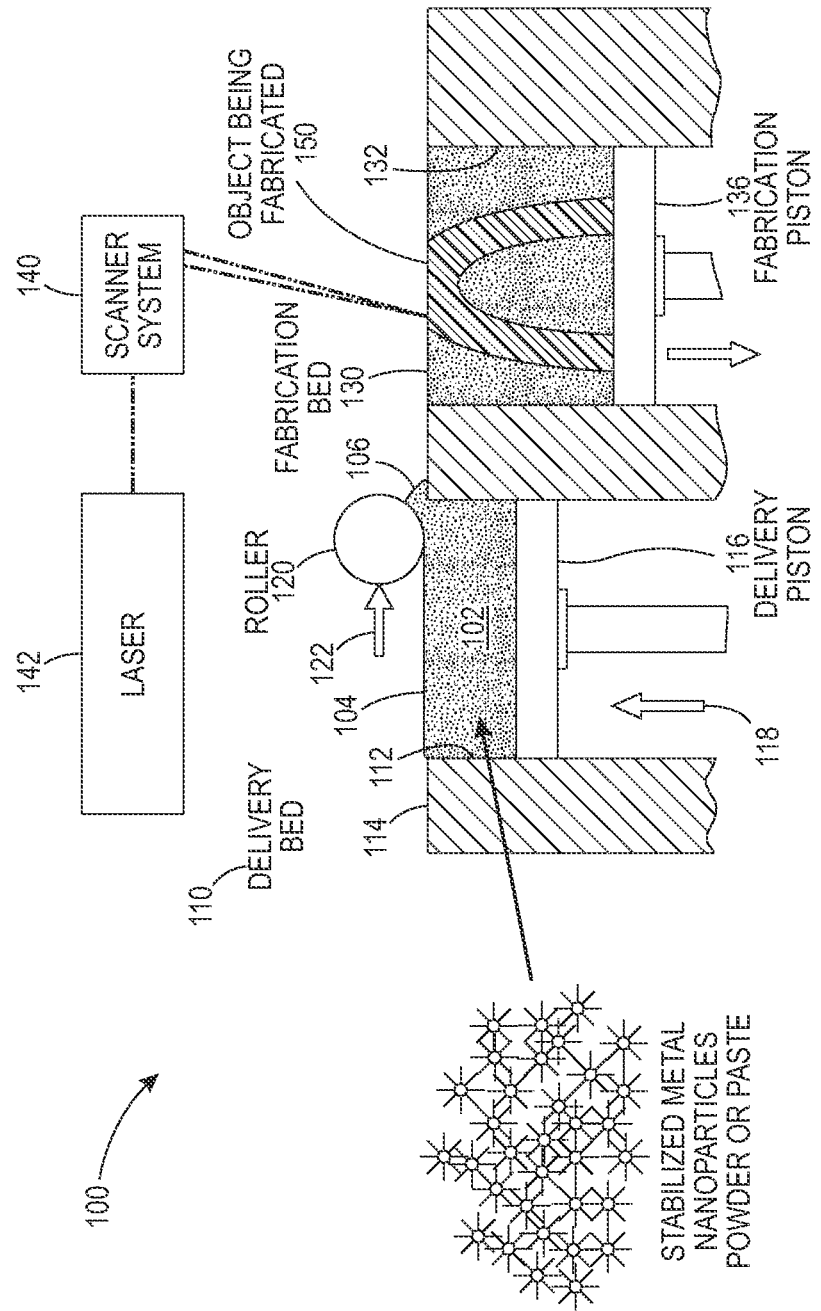

STABILIZED METALLIC NANOPARTICLES FOR 3D PRINTING

TECHNICAL FIELD

The present teachings relate generally to three-dimensional ("3D") printing and, more particularly, to materials for use in a 3D printing process that uses laser and/or E-beam sintering.

BACKGROUND 3D printing is used to produce complex 3D objects directly from computer-aided digital design. 3D printing technology can be generally divided into three categories: (1) stereolithography ("SLA"), (2) fused deposition modelling ("FDM"), and (3) powder bed technology involving a laser beam and/or an E-beam. SLA selectively solidifies photosensitive (UV curable) polymers by laser (e.g., laser sintering) or other light source, while FDM selectively deposits thermoplastic molten polymer through a heated nozzle. Both SLA and FDM, however, are limited to plastics and are not used to produce metallic objects.

Powder bed technology can be used to produce metallic objects with micron-sized powders using laser sintering. The metallic powders used during laser sintering may be potentially explosive. To reduce the risk of igniting the powder, printers using powder bed technology are oftentimes placed in a chamber sealed with nitrogen, which makes them unsuitable for home use. Furthermore, the produced objects are often porous inside, which makes them weaker when compared to objects made via conventional methods. What is needed, therefore, is an improved 3D printing process and an improved metallic material for use therein.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A material for use in a 3D printer is disclosed. The material may include a plurality of metallic particles and a stabilizing material. The metallic particles may have an average cross-sectional length that is less than or equal to about 100 nm. The stabilizing material may include an organoamine, carboxylic acid, thiol and derivatives thereof, xanthic acid, polyethylene glycols, polyvinylpyridine, polyninylpyrolidone, or a combination thereof.

In another embodiment, the material may include a plurality of metallic microparticles having an average cross-sectional length from about 1 μm to about 250 μm. The metallic microparticles may include a plurality of metallic nanoparticles having an average cross-sectional length that is less than or equal to about 50 nm and a stabilizing material on outer surfaces of the nanoparticles.

A method for printing an object with a 3D printer is also disclosed. The method may include loading a plurality of stabilized particles into a delivery bed of the 3D printer. The stabilized particles may include a plurality of metallic particles and a stabilizing material. The metallic particles may have an average cross-sectional length that is less than or equal to about 100 nm. The stabilizing material may include an amine, organoamine, carboxylic acid, thiol and derivatives thereof, xanthic acid, polyethylene glycols, polyvinylpyridine, polyninylpyrolidone, or a combination thereof. A portion of the stabilized particles may be transferred from the delivery bed to a fabrication bed of the 3D printer. The stabilized particles may be sintered in the fabrication bed at a temperature that is less than or equal to about 200° C. to form the printed object.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures:

FIG. 1 depicts an illustrative system for printing 3D metallic objects, according to one or more embodiments disclosed.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

As used herein, unless otherwise specified, the word "printer" encompasses any apparatus that performs a print outputting function for any purpose, such as a digital copier, bookmaking machine, facsimile machine, a multi-function machine, electrostatographic device, 3D printer that can make a 3D objects, etc. It will be understood that the structures depicted in the figures may include additional features not depicted for simplicity, while depicted structures may be removed or modified.

A plurality of metallic particles may be used by a 3D printer to produce a metallic object. The metallic particles may be or include any metal or metal alloy such as silver, gold, aluminum, platinum, palladium, copper, cobalt, chromium, indium, titanium, zirconium, nickel, an alloy thereof, or a combination thereof. The metallic particles may have an average cross-sectional length (e.g., diameter) that is less than or equal to about 100 nm, less than or equal to about 50 nm, or less than or equal to about 20 nm. Particles of this size may be referred to as nanoparticles. The metallic nanoparticles may be in powder form. Further, the metallic nanoparticles may include a silver nanoparticle composite or a metal nanoparticle composite, such as, for example, Au—Ag, Ag—Cu, Ag—Ni, Au—Cu, Au—Ni, Au—Ag—Cu, and Au—Ag—Pd. The various components of the composites may be present in an amount ranging for example from about 0.01% to about 99.9% by weight, particularly from about 10% to about 90% by weight Thermal diffusion may be hard to control at higher temperatures, which often induces the sintering of unwanted portions of the powder, thereby creating inconsistency in the printed object. However, metallic particles of the size described above (i.e., "nanoparticles") may have a melting and/or sintering temperature that is less than or equal to about 200° C., less than or equal to about 150° C., less than or equal to about 125° C., or less than or equal to about 100° C. By reducing the melting and/or sintering temperature into the range described above, the amount of thermal diffusion generated during the printing process may also be reduced. This may reduce inconsistency and improve printing precision.

In contrast to "micron-sized particles" or "microparticles" (e.g., particles having an average cross-sectional length from about 1 µm to about 999 µm), the metallic nanoparticles may have an improved absorbance in the UV and visible regime due to the surface plasmon absorbance. For example, silver nanoparticles have strong absorbance at around 410-420 nm. See, e.g., (J. of Microelectronics and Electronic Packaging, 2013, 10, 49-53). This absorption may enable the use of a low power (and low temperature) laser (e.g., a blue laser). In some embodiments, the particle size (i.e., an average cross-sectional length) of the nanoparticles may be less than the wavelength of the sintering light source (laser, xenon lamp, E-beam, etc.)

In addition, the metallic nanoparticles may be less likely to scatter and/or reflect the laser beam than larger microparticles. Light scattering and/or reflection may cause larger feature size than the laser beam, and thus, lower resolution in the produced object. The metallic nanoparticles may enable 3D printing at a resolution less than or equal to about 25 µm, less than or equal to about 10 µm, or less than or equal to about 5 µm. This may facilitate the production of a metallic object with a smooth surface (e.g., low surface roughness).

A stabilizing material (or stabilizer) may be added to the metallic nanoparticles to form a stabilized nanoparticle matrix (e.g., in powder form). The stabilizing material may be or include an amine (e.g., organoamine), carboxylic acid, thiol and its derivatives, —OC(S)SH (xanthic acid), polyethylene glycols, polyvinylpyridine, polyninylpyrolidone, and other organic surfactants, or a combination thereof. The metallic nanoparticles with the stabilizing material at least partially thereabout may be in the form of a plurality of particles having an average cross-sectional length (e.g., diameter) that is less than or equal to about 100 nm, less than or equal to about 50 nm, or less than or equal to about 20 nm. In some embodiments, at least a portion of the stabilizing material may be attached to the surface of the metallic nanoparticles. In other words, the metallic nanoparticles may be isolated from one another by the stabilizing material, forming a discontinuous phase. In embodiments, the stabilizing material may be an organic stabilizer. The term "organic" in "organic stabilizer" refers to, for example, the presence of carbon atom(s), but the organic stabilizer may include one or more non-metal heteroatoms such as nitrogen, oxygen, sulfur, silicon, halogen, and the like. The organic stabilizer may be an organoamine stabilizer such as those described in U.S. Pat. No. 7,270,694, which is incorporated by reference herein in its entirety. Examples of the organoamine may include an alkylamine, such as for example butylamine, pentylamine, hexylamine, heptylamine, octylamine, nonylamine, decylamine, hexadecylamine, undecylamine, dodecylamine, tridecylamine, tetradecylamine, diaminopentane, diaminohexane, diaminoheptane, diaminooctane, diaminononane, diaminodecane, diaminooctane, dipropylamine, dibutylamine, dipentylamine, dihexylamine, diheptylamine, dioctylamine, dinonylamine, didecylamine, methylpropylamine, ethylpropylamine, propylbutylamine, ethylbutylamine, ethylpentylamine, propylpentylamine, butylpentylamine, tributylamine, trihexylamine, and the like, or mixtures thereof. Examples of other organic stabilizers may include, for example, thiol and its derivatives, —OC(S)SH (xanthic acid), polyethylene glycols, polyvinylpyridine, polyninylpyrolidone, and other organic surfactants. The organic stabilizer may be selected from the group consisting of a thiol such as, for example, butanethiol, pentanethiol, hexanethiol, heptanethiol, octanethiol, decanethiol, and dodecanethiol; a dithiol such as, for example, 1,2-ethanedithiol, 1,3-propanedithiol, and 1,4-butanedithiol; or a mixture of a thiol and a dithiol. The organic stabilizer may be selected from the group consisting of a xanthic acid such as, for example, O-methylxanthate, O-ethylxanthate, O-propylxanthic acid, O-butylxanthic acid, O-pentylxanthic acid, O-hexylxanthic acid, O-heptylxanthic acid, O-octylxanthic acid, O-nonylxanthic acid, O-decylxanthic acid, O-undecylxanthic acid, O-dodecylxanthic acid. Organic stabilizers containing a pyridine derivative (for example, dodecyl pyridine) and/or organophosphine that may stabilize metal nanoparticles may also be used as a stabilizer.

Further examples of stabilized silver nanoparticles may include: the carboxylic acid-organoamine complex stabilized silver nanoparticles described in U.S. Patent Application Publication No. 2009/0148600; the carboxylic acid stabilizer silver nanoparticles described in U.S. Patent App. Publication No. 2007/0099357 A1, and the thermally removable stabilizer and the UV decomposable stabilizers described in U.S. Patent Application Publication No. 2009/0181183, each of which is incorporated by reference herein in its entirety.

The stabilizing material may coat the metallic nanoparticles to reduce or eliminate the possibility of the nanoparticles igniting or exploding when heated by the laser. For example, the stabilizing material may form a non-conductive organic shell at least partially around the metallic nanoparticles that serves as a buffer. Explosion of the metallic nanoparticles may be evaluated using the $K_{st}$ explosion value. In some embodiments, the $K_{st}$ value may be less than 100 bar*m/sec, less than 50 bar*m/sec, or less than 25 bar*m/sec. $K_{st}$ represents the size-normalized maximum rate of pressure rise for a constant-volume explosion, as determined in standardized equipment using standardized test procedures. It is an explosibility parameter.

The metallic nanoparticles may be present in the stabilized nanoparticle matrix in an amount from about 65 wt % to about 75 wt %, about 75 wt % to about 85 wt %, about 85 wt % to about 95 wt %, or more, and the stabilizing material may be present in the stabilized nanoparticle matrix in an amount from about 5 wt % to about 15 wt %, about 15 wt % to about 25 wt %, about 25 wt % to about 35 wt %, or more. The metallic nanoparticles may be present in the stabilized nanoparticle matrix in an amount from about 20 vol % to about 30 vol %, about 30 vol % to about 40 vol %, about 40 vol % to about 50 vol %, about 50 vol % to about 60 vol %, or more, and the stabilizing material may be present in the stabilized nanoparticle matrix in an amount from about 40 vol % to about 50 vol %, about 50 vol % to about 60 vol %, about 60 vol % to about 70 vol %, or more. In one embodiment, the metallic nanoparticles may be present in the stabilized nanoparticle matrix in an amount from about 20 vol % to about 49 vol %, and the stabilizing material may be present in the stabilized nanoparticle matrix in an amount from about 51 vol % to about 80 vol %.

The metallic nanoparticles and/or the stabilized nanoparticle matrix (i.e., the metallic nanoparticles plus the stabilizing material) may be loaded into the 3D printer in at least three different forms. In the first form, the metallic nanoparticles and/or the stabilized nanoparticle matrix may agglomerate to form particles having an average cross-sectional length (e.g., diameter) from about 1 µm to about 500 µm, about 5 µm to about 250 µm, or about 100 µm to about 250 µm. In other words, the metallic nanoparticles used in the 3D printer may be micron particles. Each microparticle may include a plurality of nanoparticles.

In the second form, the metallic nanoparticles and/or the stabilized nanoparticle matrix may be dispersed in one or more liquid solvents to form a paste. The solvents may be or include hydrocarbon, alcohol, ester, ketone, ether, or a combination thereof. An illustrative hydrocarbon includes an aliphatic hydrocarbon such as decalin, bicyclohexyl, dodecane, tetradecane, Isopar, and the like, an aromatic hydrocarbon such as xylene, trimethylbenzene, ethylbenzene, propyl benzene, butylbenzene, pentylbenzene, methyl ethylbenzene, tetrahydronaphthalene, and the like. An illustrative alcohol may include terpineol, ethylene glycol, ethanol, butanol, carbitol, and the like. An illustrative ester may include propylene glycol monoethyl acetate (PGMEA), or DPGMEA. The paste may prevent the metallic nanoparticles from forming dust clouds during the fabrication process. In addition, diluting the matrix with the solvent may further reduce the risk of the nanoparticles igniting or exploding when heated by the laser. Furthermore, the paste may be applied more uniformly in a layer in the fabrication bed (described below), which may provide more uniformity in the printed object.

In the third form, the metallic nanoparticles may be dispersed in a polymer matrix to form micron-sized particles (e.g., powder). The polymer matrix may be or include polyester, polycarbonate, polystyrene, acrylate polymer, polyvinylpyridine, polyninylpyrolidone or a combination thereof. The micron-sized particles may be formed by dispersing the metallic nanoparticles in a solvent (e.g., one or more of the solvents disclosed above), drying the metallic nanoparticles, and breaking the resulting solid down to form the micron powder.

FIG. 1 depicts an illustrative 3D printer 100 for printing 3D metallic objects, according to one or more embodiments disclosed. The printer 100 may include a delivery bed 110 defined by one or more sidewalls 112 and a delivery piston 116. The stabilized metallic nanoparticles (e.g., the matrix) 102 may be loaded into the delivery bed 110 in powder and/or paste form. Once loaded, the upper surface 104 of the stabilized metallic nanoparticles 102 may be even with or below the upper surface 114 of the sidewall 112. The delivery piston 116 may then move upwards in the direction of arrow 118 until the upper surface 104 of the stabilized nanoparticles 102 is even with or above the upper surface 114 of the sidewall 112.

A transfer member (e.g., a roller) 120 may then transfer a portion 106 of the stabilized metallic nanoparticles 102 above the upper surface 114 of the sidewall 112 from the delivery bed 110 into a fabrication bed 130 (e.g., in the direction of the arrow 122). The fabrication bed 130 may be defined by one or more sidewalls 132 and a fabrication piston 136. The transferred portion 106 of the stabilized nanoparticles 102 may form a first layer in the fabrication bed 130 that has a thickness from about 10 μm to about 50 μm, about 50 μm to about 100 μm, about 100 μm to about 250 μm, or more.

A scanning system 140 may scan the stabilized metallic nanoparticles 102 in the first layer, and a laser 142 may then sinter the first layer in response to the scan results. The laser 142 may be a continuous wave laser or a pulse laser. When the laser 142 is a pulse laser, the pulse length and intervals may be adjusted for proper sintering. For example, when the metallic nanoparticle paste is used in the printing process, the pulses may have a relatively long interval (e.g., from about 100 ms to about 5 s) to allow time for the solvent to at least partially evaporate. The sintering may take place at a temperature less than or equal to about 200° C., a temperature less than or equal to about 150° C., less than or equal to about 125° C., or less than or equal to about 100° C.

Once the first layer has been sintered in the fabrication bed 130, the delivery piston 116 may then move upwards again in the direction of the arrow 118 until the upper surface 104 of the stabilized nanoparticles 102 is again even with or above the upper surface 114 of the sidewall 112 of the delivery bed 110. The fabrication piston 136 may move downwards. The transfer member 120 may then transfer another portion of the stabilized nanoparticles 102 that are above the upper surface 114 of the sidewall 112 from the delivery bed 110 into the fabrication bed 130 to form a second layer that is on and/or over the first layer. The laser 142 may then sinter the second layer. This process may be repeated until the desired 3D object is produced.

Example

The following example is provided for illustrative purposes and is not meant to be limiting. 88.91 g of dodecylamine was mixed in a solvent including 30 ml of decalin and 6 ml of methanol. The mixture was heated to 40° C. in a reaction flask under an argon atmosphere until the dodecylamine dissolved. The mixture was then reduced to 30° C., and 6.54 g of a reducing agent (phenylhydrazine) was added to the mixture as the mixture was stirred. 20 g of silver acetate was then added gradually to the mixture over a 2 hour period at a temperature between 30° C. and 35° C. This caused the color of the mixture to change from clear to dark brown, which indicated the formation of silver nanoparticles.

The mixture was then heated to 40° C. and stirred for one hour. The mixture was then precipitated by adding 100 ml of methanol while stirring, and then the mixture was collected by filtration. The collected solid was transferred to a glass beaker and stirred in 50 ml of methanol. This product was collected by filtration and dried in a vacuum oven at room temperature (e.g., 20° C.) for 24 hours, yielding 13.11 g of dark blue silver nanoparticles. The silver content was 87.6 wt %, as measured by the Ash technique. Assuming a density of 10 g/ml for the silver nanoparticles and 1.0 g/ml for the dodecylamine, the silver in the stabilized silver nanoparticles was estimated to be about 41 vol %.

The silver nanoparticle powder was submitted for $K_{st}$ measurement. The $K_{st}$ value was found to be about 20 bar*m/sec, indicating that the powder was non-explosive. This may be due to the high volume percentage of stabilizers in the silver nanoparticle powder. In other embodiments, the $K_{st}$ value may be less than 50 bar*m/sec.

The silver nanoparticles were formulated into inkjet ink on a polyethylene terephthalate ("PET") substrate as thin lines. A portion of the printed lines were thermally sintered in an oven at 130° C. for 10 minutes, while the remaining portion of the lines were subjected to pulse light fusing at different pulse lengths from 100 μs to 50 ms. It was found that the printed lines could be sintered using pulsed light to achieve the same conductivity as those sintered by thermal sintering. The pulse light may include a laser, a Xenon lamp, a Mercury lamp, or a combination thereof.

A portion of the silver nanoparticles was also dispersed into terpineol as a paste. The paste was loaded into the delivery bed. A doctor blade was used to apply a uniform layer (about 200 μm) of the silver paste to the fabrication bed. An argon laser (488 nm) was used to sinter the silver nanoparticles into pure conductive silver at the desired location. The silver nanoparticles have a surface plasmon absorption from about 420 nm to about 440 nm. After the first layer of the silver nanoparticles was sintered, the delivery piston was lifted about 200 μm, and a second layer of the silver paste was transferred to the fabrication bed using the blade. The second layer was about 200 μm thick. The second layer of the paste was sintered using the laser to continue building the 3D object.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

What is claimed is:

1. A material for use in a 3D printer, comprising:
a plurality of metallic microparticles having an average cross-sectional length from about 1 μm to about 250 μm, wherein the metallic microparticles comprise:
a plurality of metallic nanoparticles having an average cross-sectional length that is less than or equal to about 50 nm; and
a stabilizing material disposed on outer surfaces of the nanoparticles, wherein the stabilizing material comprises an organoamine, carboxylic acid, thiol and derivatives thereof, xanthic acid, polyethylene glycols, polyvinylpyridine, polyvinylpyrrolidone, or a combination thereof.

2. The material of claim 1, wherein the average cross-sectional length of the metallic nanoparticles is less than or equal to about 20 nm.

3. The material of claim 2, wherein the metallic nanoparticles comprise gold, silver, aluminum, platinum, palladium, copper, cobalt, chromium, indium, titanium, zirconium, nickel, an alloy thereof, or a combination thereof.

4. The material of claim 2, wherein the metallic nanoparticles are configured to melt at a temperature that is less than or equal to about 200° C.

5. The material of claim 4, wherein the stabilizing material at least partially covers the metallic nanoparticles, and wherein the metallic nanoparticles with the stabilizing material have an average cross-sectional length that is less than or equal to about 100 nm.

6. The material of claim 4, wherein the metallic nanoparticles are present in the material in an amount from about 65 wt % to about 95 wt %, and the stabilizing material is present in the material in an amount from about 5 wt % to about 35 wt %.

7. The material of claim 6, wherein the metallic nanoparticles are present in the material in an amount from about 20 vol % to about 49 vol %, and the stabilizing material is present in the material in an amount from about 51 vol % to about 80 vol %.

8. The material of claim 1, further comprising a solvent comprising a hydrocarbon, an alcohol, a ketone, an ester, an ether, or a combination thereof.

9. The material of claim 1, wherein the metallic nanoparticles and the stabilizing material agglomerate to form the microparticles.

10. The material of claim 1, wherein the metallic nanoparticles are in a discontinuous phase.

11. A material for use in a 3D printer, comprising:
a plurality of metallic microparticles having an average cross-sectional length from about 1 μm to about 250 μm, wherein the metallic microparticles comprise a plurality of metallic nanoparticles having an average cross-sectional length that is less than or equal to about 50 nm and a stabilizing material on outer surfaces of the nanoparticles.

12. The material of claim 11, wherein the metallic microparticles have an explosion $K_{st}$ value less than 50 bar*m/sec.

13. The material of claim 11, wherein the metallic nanoparticles comprise gold, silver, aluminum, platinum, palladium, copper, cobalt, chromium, indium, titanium, zirconium, nickel, an alloy thereof, or a combination thereof.

14. The material of claim 11, wherein the metallic nanoparticles form a discontinuous phase.

15. A method for printing an object with a 3D printer, comprising:
   loading a plurality of stabilized metallic microparticles into a delivery bed of the 3D printer, wherein the stabilized metallic microparticles have an average cross-sectional length from about 1 μm to about 250 μm, and wherein the stabilized metallic microparticles comprise:
      a plurality of metallic nanoparticles having an average cross-sectional length that is less than or equal to about 50 nm; and
      a stabilizing material on outer surfaces of the nanoparticles;
   transferring a portion of the stabilized metallic microparticles from the delivery bed to a fabrication bed of the 3D printer; and
   sintering the stabilized metallic microparticles in the fabrication bed at a temperature that is less than or equal to about 200° C. to form the printed object.

16. The method of claim 15, wherein transferring the portion of the stabilized metallic microparticles to the fabrication bed comprises forming a layer of the stabilized metallic microparticles having a thickness from about 10 μm to about 250 μm.

17. The method of claim 15, wherein the sintering is performed by multiple pulses of light.

18. The method of claim 15, wherein the stabilized metallic microparticles are in the form of a paste and further comprise a solvent, and wherein the solvent comprises hydrocarbon, alcohol, ketone, ester, ether, or a combination thereof.

19. The method of claim 15, wherein the metallic nanoparticles are present in the stabilized metallic microparticles in an amount from about 65 wt % to about 95 wt % and in an amount from about 20 vol % to about 60 vol %, and wherein the stabilizing material is present in the stabilized metallic microparticles in an amount from about 5 wt % to about 35 wt % and in an amount from about 40 vol % to about 80 vol %.

20. The method of claim 15, wherein the printed object is configured to have a resolution that is less than or equal to about 25 μm after being sintered.

* * * * *